US009721124B1

(12) United States Patent
Chen et al.

(10) Patent No.: US 9,721,124 B1
(45) Date of Patent: Aug. 1, 2017

(54) MAGNETIC CARD READER

(71) Applicant: VERIFONE, INC., San Jose, CA (US)

(72) Inventors: Bolling Chen, New Taipei (TW); Steve Hsu, Taoyuan (TW)

(73) Assignee: VERIFONE, INC., San Jose, CA (US)

( * ) Notice: Subject to any disclaimer, the term of this patent is extended or adjusted under 35 U.S.C. 154(b) by 0 days.

(21) Appl. No.: 15/014,403

(22) Filed: Feb. 3, 2016

(51) Int. Cl.
G06K 7/08 (2006.01)
(52) U.S. Cl.
CPC .................... G06K 7/084 (2013.01)
(58) Field of Classification Search
CPC .......... G06K 7/082; G06K 7/084; G06K 7/00; G06K 7/01; G11B 5/105; G11B 5/48
USPC ................ 235/435, 439, 449, 487, 493, 494
See application file for complete search history.

(56) References Cited

U.S. PATENT DOCUMENTS

| 3,949,193 | A | | 4/1976 | Dowdell |
| 4,028,734 | A | | 6/1977 | Mos |
| 4,176,259 | A | * | 11/1979 | Lee ...................... G06K 7/084 235/449 |
| 4,184,179 | A | | 1/1980 | Deming |
| 4,538,191 | A | | 8/1985 | Suzuki et al. |
| 4,631,610 | A | | 12/1986 | Kobayashi et al. |
| 4,777,551 | A | * | 10/1988 | Seki ..................... G11B 5/4833 360/130.3 |
| 5,196,680 | A | | 3/1993 | Schuder |
| 5,270,523 | A | | 12/1993 | Chang et al. |
| 5,463,678 | A | * | 10/1995 | Kepley, III ............ G06K 7/084 235/449 |
| 5,929,427 | A | | 7/1999 | Harada |
| 5,945,654 | A | | 8/1999 | Huang |
| 5,984,184 | A | | 11/1999 | Kojima |
| 6,042,010 | A | | 3/2000 | Kanayama et al. |
| 6,250,552 | B1 | | 6/2001 | Hirasawa |
| 6,342,982 | B1 | | 1/2002 | Kanayama et al. |
| 6,585,156 | B2 | | 7/2003 | Takita |
| 6,601,765 | B2 | | 8/2003 | Yuan |
| 6,817,524 | B2 | | 11/2004 | Hilton et al. |
| 6,866,201 | B2 | | 3/2005 | Abe et al. |
| 6,927,928 | B2 | | 8/2005 | Nakabo et al. |
| 7,347,370 | B2 | | 3/2008 | McJones |
| 7,753,275 | B2 | | 7/2010 | Schulz |
| 8,333,521 | B2 | | 12/2012 | Viglione |

(Continued)

FOREIGN PATENT DOCUMENTS

| JP | 2-281464 A | 11/1990 |
| JP | 4-60910 A | 2/1992 |
| JP | 10-83529 A | 3/1998 |

OTHER PUBLICATIONS

Notice of Allowance dated Jul. 20, 2016, which issued during the prosecution of U.S. Appl. No. 14/580,995.

(Continued)

Primary Examiner — Laura Gudorf
(74) Attorney, Agent, or Firm — Hunton & Williams LLP

(57) ABSTRACT

A magnetic stripe reader including a base element defining a first spring seat, a magnetic module support element arranged for limited pivotable motion relative to the base element and defining a second spring seat, a generally truncated conical spring having a first, relatively large diameter end seated in the first spring seat and a second, relatively small diameter end seated in the second spring seat and a magnetic module fixedly mounted onto the magnetic module support element.

7 Claims, 10 Drawing Sheets

(56) References Cited

U.S. PATENT DOCUMENTS

| | | |
|---|---|---|
| 9,038,891 B2 | 5/2015 | Lewis |
| 2004/0104722 A1 | 6/2004 | Kainuma et al. |
| 2006/0176065 A1 | 8/2006 | Koch et al. |
| 2009/0072033 A1 | 3/2009 | Schulz |
| 2011/0006118 A1 | 1/2011 | Mizawa |
| 2011/0278359 A1* | 11/2011 | Kasai .................... G06K 7/084 235/449 |
| 2013/0119136 A1 | 5/2013 | Ishikawa |
| 2014/0021255 A1 | 1/2014 | Lo et al. |
| 2014/0217169 A1 | 8/2014 | Lewis |
| 2016/0180119 A1 | 6/2016 | Yanko et al. |

OTHER PUBLICATIONS

An Office Action dated Oct. 5, 2009, which issued during the prosecution of U.S. Appl. No. 11/856,460.
Notice of Allowance dated Mar. 8, 2010, which issued during the prosecution of U.S. Appl. No. 11/856,460.
An Office Action dated Jul. 31, 2015, which issued during the prosecution of U.S. Appl. No. 14/580,995.
An Office Action dated Apr. 14, 2016, which issued during the prosecution of U.S. Appl. No. 14/580,995.

* cited by examiner

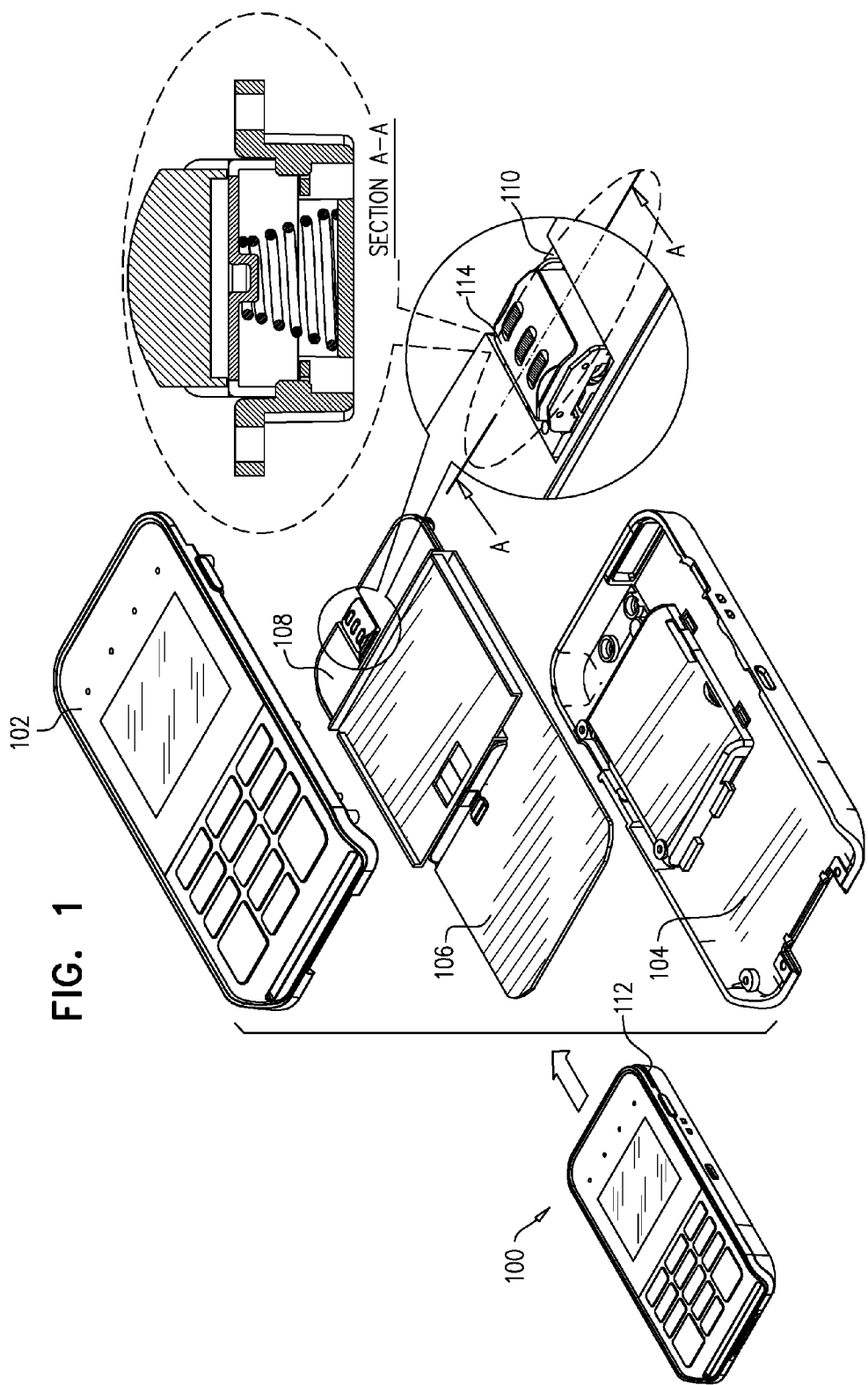

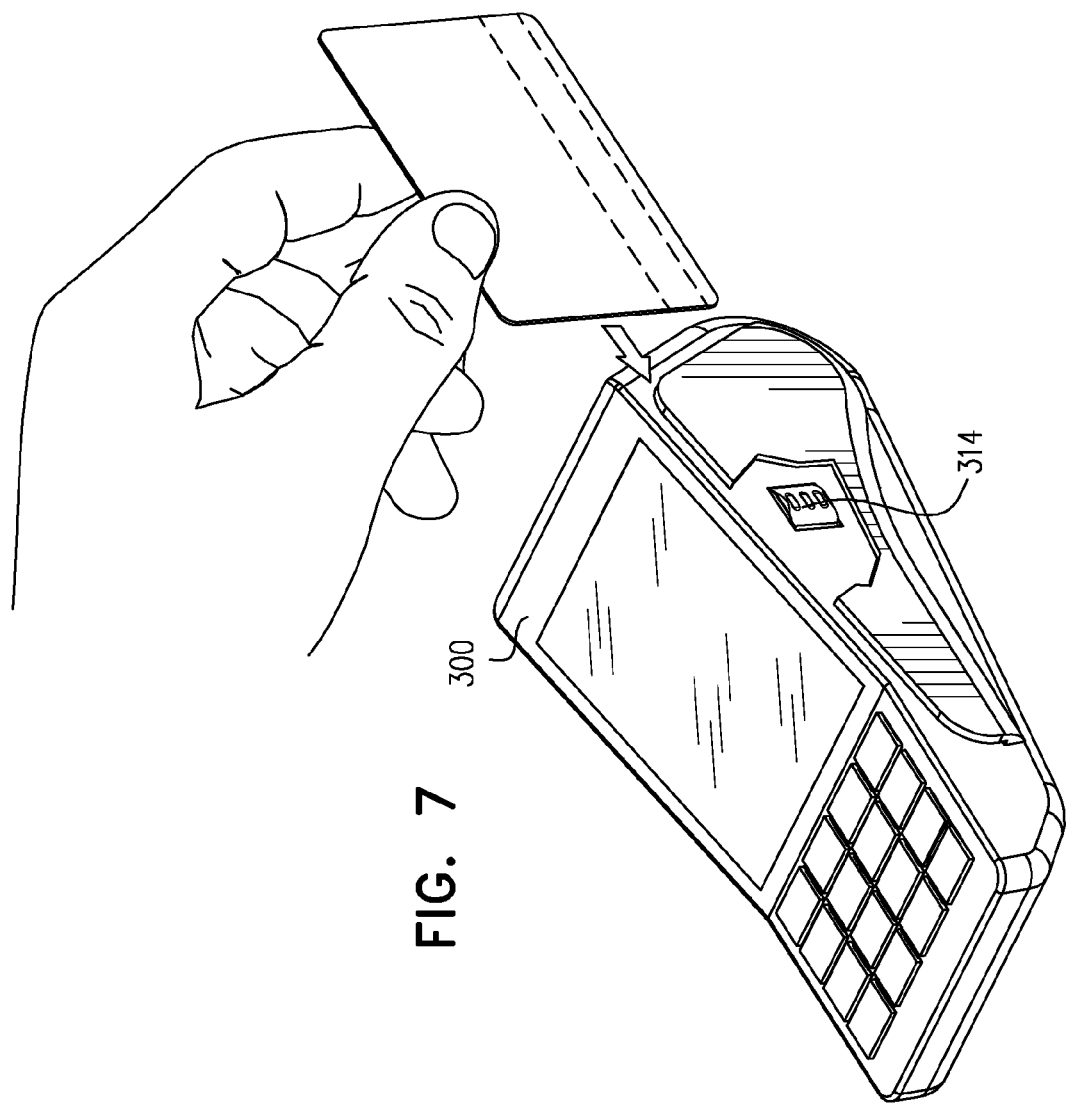

MAGNETIC CARD READER

REFERENCE TO RELATED APPLICATION

Reference is hereby made to U.S. patent application Ser. No. 14/580,995, filed Dec. 23, 2014 and entitled Magnetic Stripe Card Reader, the disclosure of which is hereby incorporated herein by reference.

FIELD OF THE INVENTION

The present invention relates to magnetic stripe card readers generally.

BACKGROUND OF THE INVENTION

Various types of magnetic stripe card readers are known.

SUMMARY OF THE INVENTION

The present invention seeks to provide an improved magnetic stripe card reader.

There is thus provided in accordance with a preferred embodiment of the present invention a magnetic stripe reader including a base element defining a first spring seat, a magnetic module support element arranged for limited pivotable motion relative to the base element and defining a second spring seat, a generally truncated conical spring having a first, relatively large diameter end seated in the first spring seat and a second, relatively small diameter end seated in the second spring seat and a magnetic module fixedly mounted onto the magnetic module support element.

Preferably, the magnetic module support element includes a generally planar portion and a pair of legs disposed generally perpendicularly to generally planar portion, each of the pair of legs defining an elongate slot. Additionally, the base element includes a pair of cylindrical protrusions and a pair of corresponding protrusions and each of the pair of cylindrical protrusions and each of the pair of corresponding protrusions is located in sliding engagement with a corresponding one of the elongate slots associated with one of the pair of legs.

In accordance with a preferred embodiment of the present invention the sliding engagement guides and limits mutual spring loaded displacement between the base element and the magnetic module support element.

In accordance with a preferred embodiment of the present invention the magnetic module support element includes a retaining tab extending in a plane parallel to the plane of generally planar portion and the base element includes a tab engagement surface portion engaging the retaining tab.

In accordance with a preferred embodiment of the present invention the generally truncated conical spring provides displacement of the magnetic module support element relative to the base element when the magnetic stripe reader is engaged by a leading edge of a payment card.

BRIEF DESCRIPTION OF THE DRAWINGS

The present invention will be understood and appreciated more fully from the following detailed description, taken in conjunction with the drawings in which:

FIG. 1 is a simplified illustration of a card reader constructed and operative in accordance with one preferred embodiment of the present invention.

FIG. 7 is a simplified illustration of a card reader constructed and operative in accordance with another preferred embodiment of the present invention.

DETAILED DESCRIPTION OF PREFERRED EMBODIMENTS

Figure 2A:
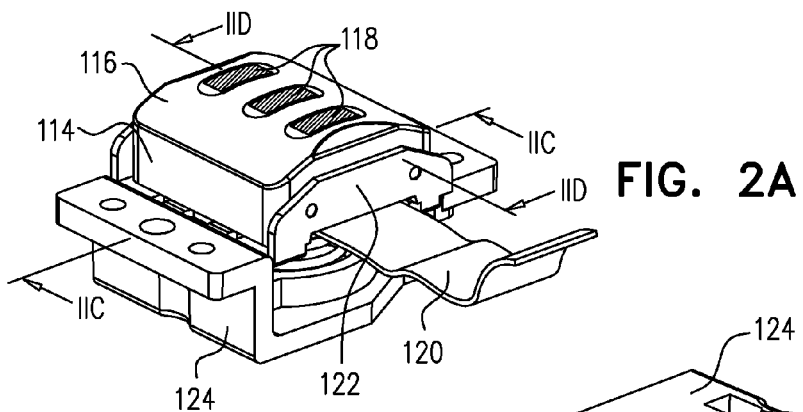
FIGS. 2A and 2B are respective downward-facing and upward-facing pictorial illustrations of a magnetic stripe reader module forming part of the card reader of FIG. 1.
Figure 2B:
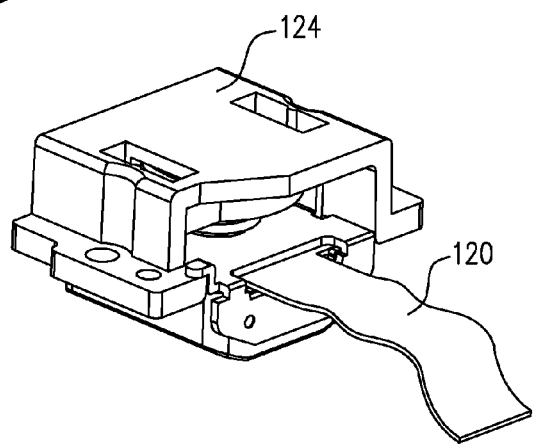

Reference is now made to FIG. 1, which is a simplified illustration of a card reader 100 constructed and operative in accordance with one preferred embodiment of the present invention. As seen in FIG. 1, the card reader 100 comprises a housing, preferably including a top portion 102 and a bottom portion 104. Disposed within the housing, inter alia, is a main board 106 and a magnetic stripe reader module support base 108 having an aperture 110 communicating with a card swipe slot 112. A magnetic stripe reader module 114 extends partially through aperture 110 into slot 112. It is appreciated that throughout the description, the terms "top", "bottom", "upper", "lower" and similar terms refer to the orientations of the various elements as shown in FIG. 1, with the understanding that the orientation of the card reader 100 and of the magnetic stripe reader module can be any suitable orientation.

Referring now additionally to FIGS. 2A-3B, it is seen that in accordance with a preferred embodiment of the present invention, magnetic stripe reader module 114 preferably comprises a magnetic reader head portion 116, typically including three parallel mutually spaced magnetic track reading sensors 118. Magnetic reader head portion 116 is coupled to a flexible flat cable 120, which operatively connects it to circuitry (not shown) preferably mounted on main board 106.

Magnetic reader head portion 116 and flexible flat cable 120 are fixedly mounted onto a magnetic head mounting bracket 122. It is a particular feature of an embodiment of the present invention, that magnetic head mounting bracket 122 is spring mounted onto a base element 124 via a truncated cone spring 126. A pair of mounting screws 128 serve to attach the magnetic stripe reader module 114 onto the magnetic stripe reader module support base 108 at aperture 110.

Magnetic head mounting bracket 122 preferably comprises a generally planar portion 130 and a pair of upstanding end portions 131 and 132 integrally formed with planar portion 130 at opposite ends thereof. A pair of legs 134 and 136 are disposed generally perpendicularly to generally planar portion 130 and extend therefrom in a direction opposite to that of upstanding end portions 132. Legs 134 and 136 are preferably formed with elongate slots respectively designated by reference numerals 138 and 140 and foot portions respectively designated by reference numerals 142 and 144 which lie in a plane parallel to that of planar portion 130 and span respective slots 138 and 140.

A retaining tab 146 extends in a plane parallel to that of planar portion 130 from a depending portion 148 located at one corner of generally planar portion 130. A central depending protrusion 150 is preferably formed at a center of an underside surface 152 of generally planar portion 130. A corresponding recess 154 is preferably formed at the center of an upper surface 156 of generally planar portion 130. A slot 158 is preferably formed at a junction of planar portion 130 and upstanding end portion 131 and preferably accommodates flexible flat cable 120, which extends therethrough.

A pair of spot welding locations 160 are preferably located on each of upstanding end portions 131 and 132 and define locations onto which magnetic reader head portion 116 is spot welded thereto.

Figure 4A:
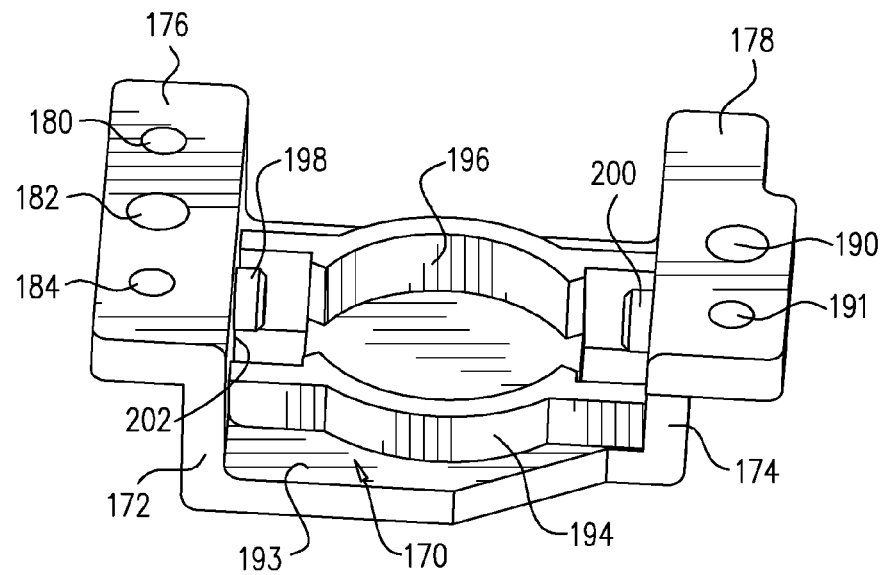
FIGS. 4A and 4B are simplified pictorial illustrations of a base portion of the magnetic stripe reader module of FIGS. 2A-3B, shown in two different orientations.
Figure 4B:
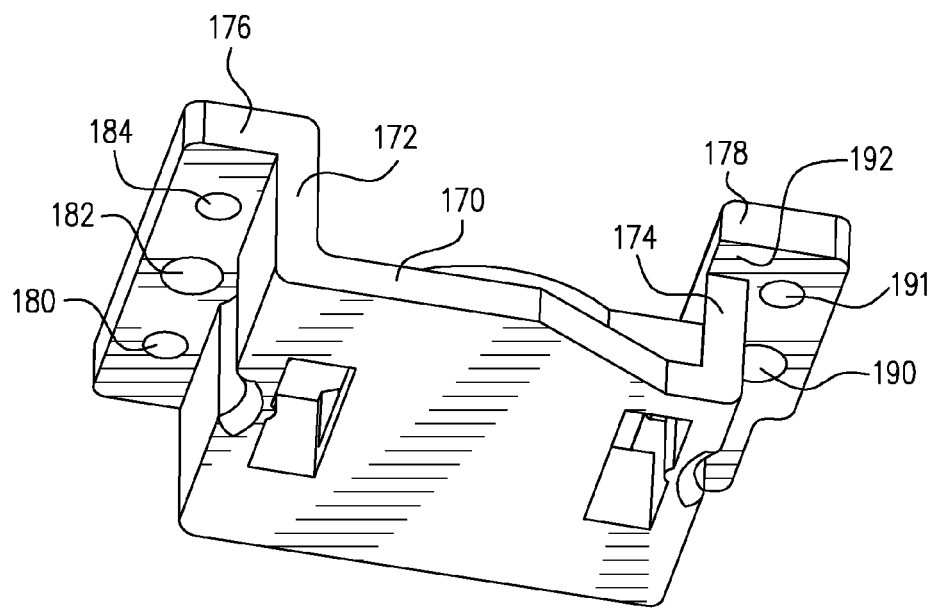

Reference is now made additionally to FIGS. 4A and 4B, which are simplified pictorial illustrations of base element 124. As seen in FIGS. 1-4B, base element 124 includes a central portion 170 having a pair of upstanding side portions 172 and 174, terminating in corresponding mounting flanges 176 and 178. Mounting flange 176 includes three apertures, here designated by reference numerals 180, 182 and 184, while mounting flange 178 includes two apertures, here designated by reference numerals 190 and 191. Mounting flange 178 extends beyond corresponding side portion 174 and defines a tab engagement surface portion 192.

Formed on an upper surface 193 of central portion 170 are a pair of partially circular spring seat defining portions, here designated by reference numerals 194 and 196. Formed in mutually facing orientations on inner facing surfaces of upstanding side portions 172 and 174 are respective generally cylindrical protrusions 198 and 200 and a pair of corresponding protrusions 202 and 204, each having a partially circular cross-section and extending from corresponding cylindrical protrusions 198 and 200 to upper surface 193.

Figure 2C:
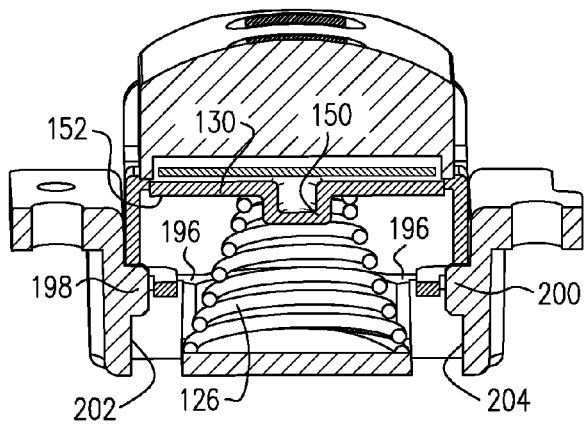
FIGS. 2C and 2D are sectional illustration taken along respective lines IIC-IIC and IID-IID in FIG. 2A.
Figure 2D:
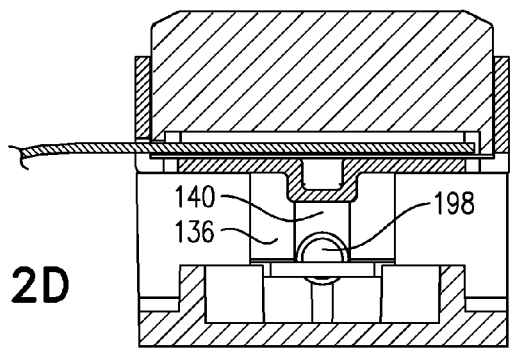
Figure 3A:
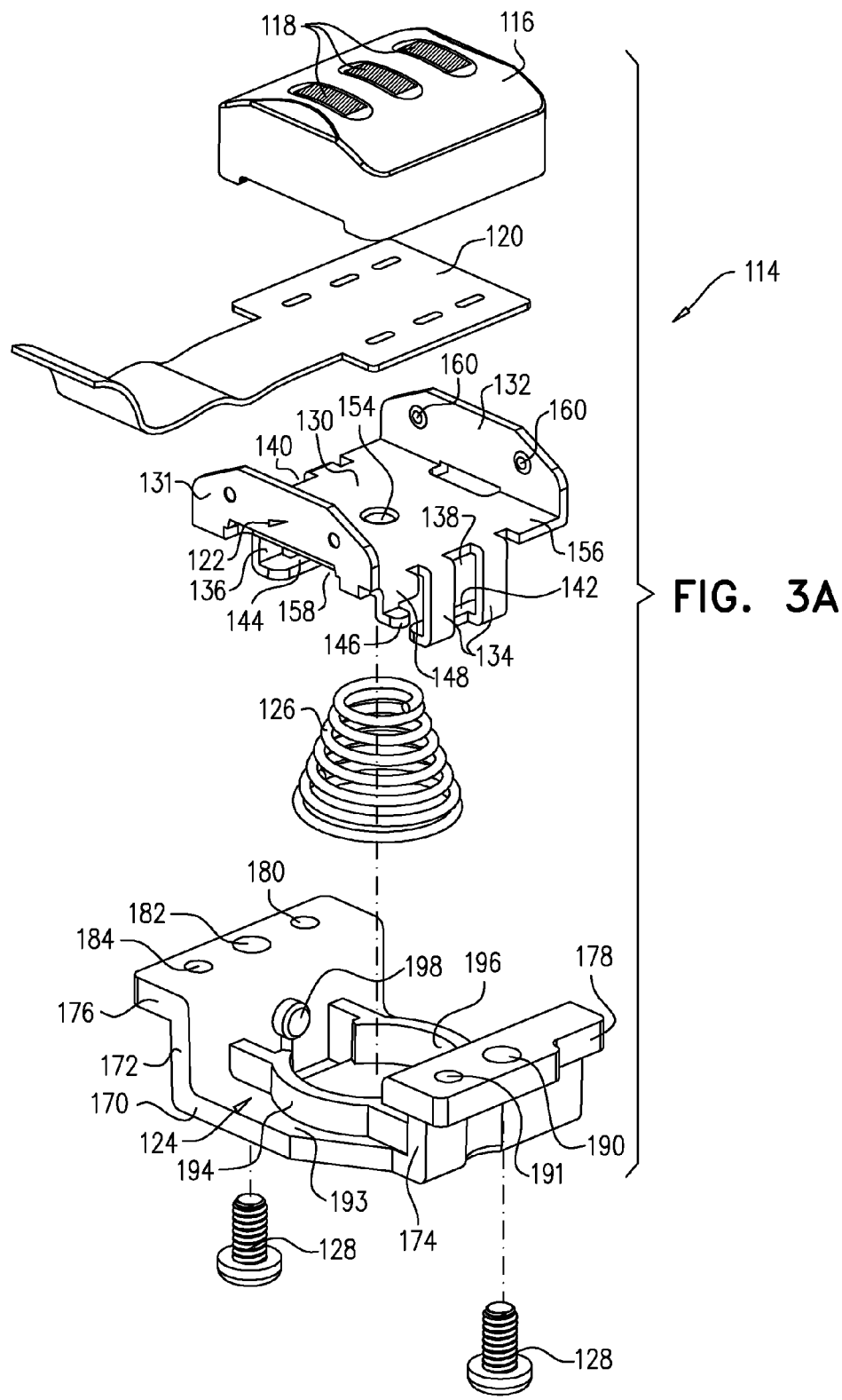
FIGS. 3A and 3B are respective downward-facing and upward-facing exploded view illustrations of a magnetic stripe reader module forming part of the card reader of FIG. 1.
Figure 3B:
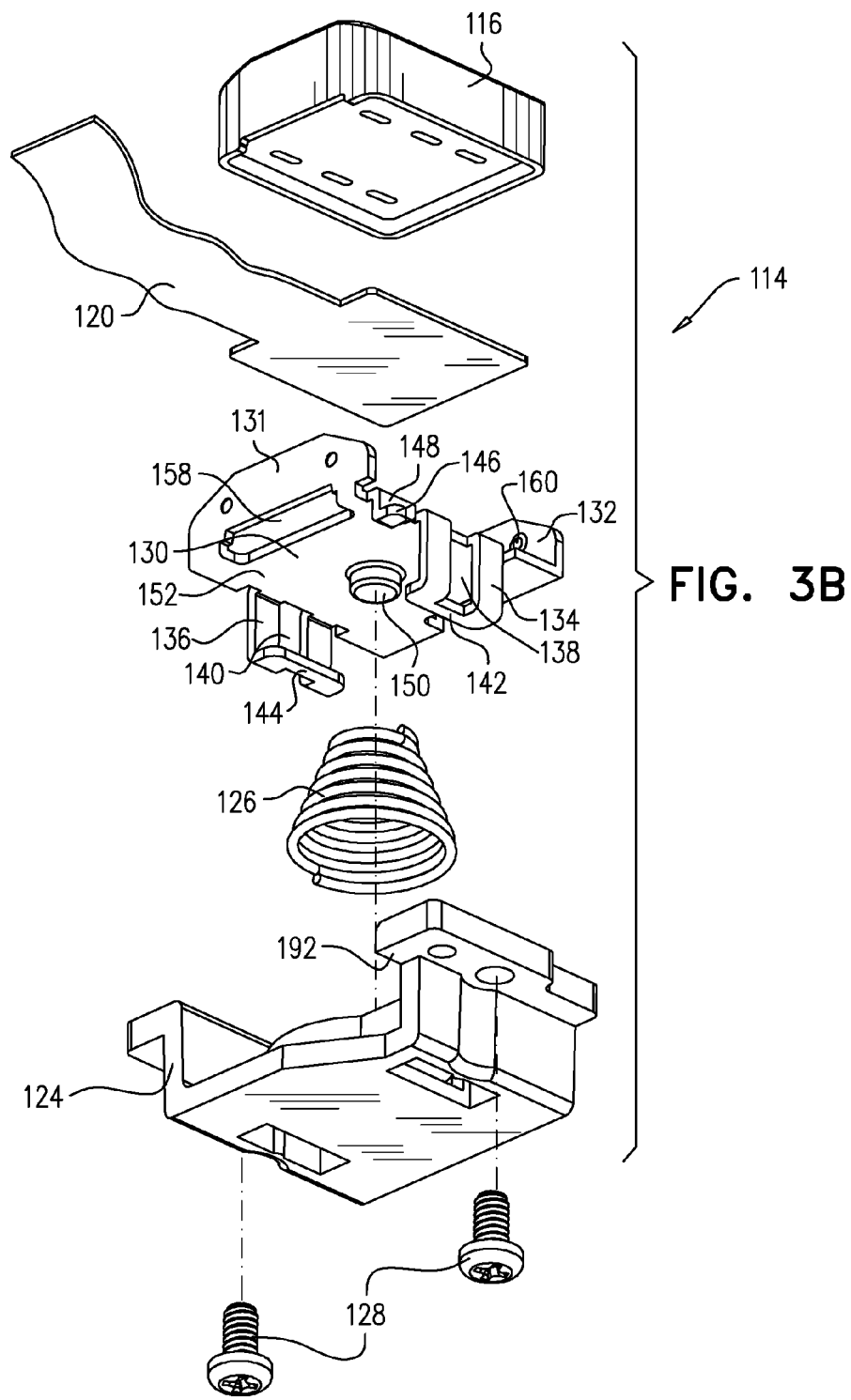

Referring now particularly to FIGS. 2C and 2D, it is appreciated that when assembled, the truncated cone spring 126 is seated at its narrow end about protrusion 150 extending downwardly from underside surface 152 of generally planar portion 130 of magnetic head mounting bracket 122 and is seated at its wide end between circular spring seat defining portions 194 and 196 which extend from upper surface 193 of central portion 170 of base element 124.

Generally cylindrical protrusions 198 & 200 and corresponding protrusions 202 & 204 of base element 124 are preferably located in slidable engagement with respective elongate slots 138 and 140 of respective legs 134 and 136 of magnetic head mounting bracket 122 for guiding and limiting mutual spring loaded displacement therebetween as described hereinbelow with respect to FIGS. 6A-6C.

Figure 5:
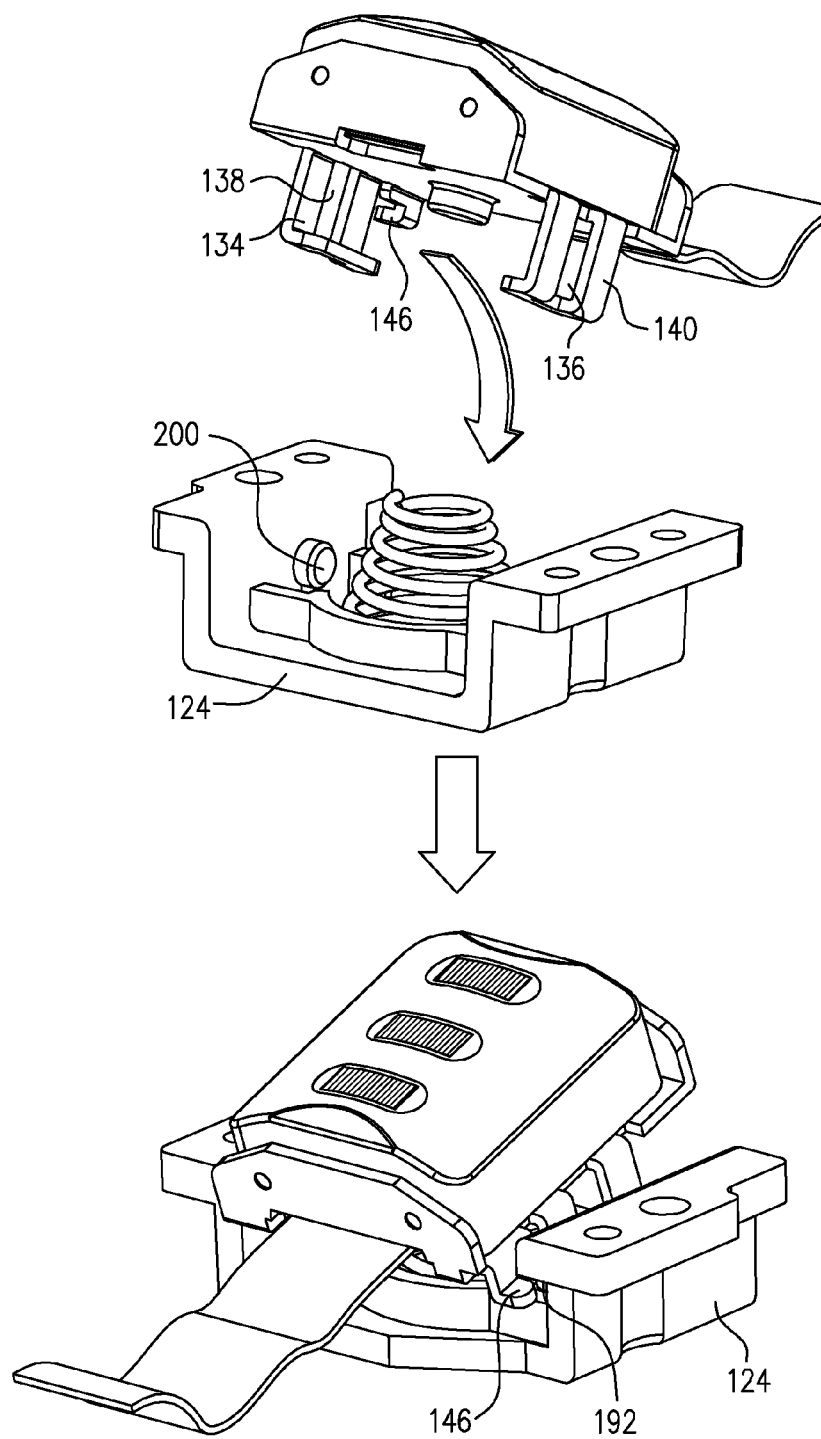
FIG. 5 is a simplified illustration of a stage in the assembly of the magnetic stripe reader module of FIGS. 2A-4B.

Reference is now made additionally to FIG. 5, which is a simplified illustration of a stage in the assembly of the magnetic stripe reader module of FIGS. 2A-4B. It is seen that tab 146 is preferably brought into engagement with tab engagement surface portion 192 of base element 124 just prior to arrangement of slots 138 and 140 of magnetic head mounting bracket 122 into slidable operative engagement with protrusions 198 & 202 and 200 & 204 of base element 124.

Figure 6A:
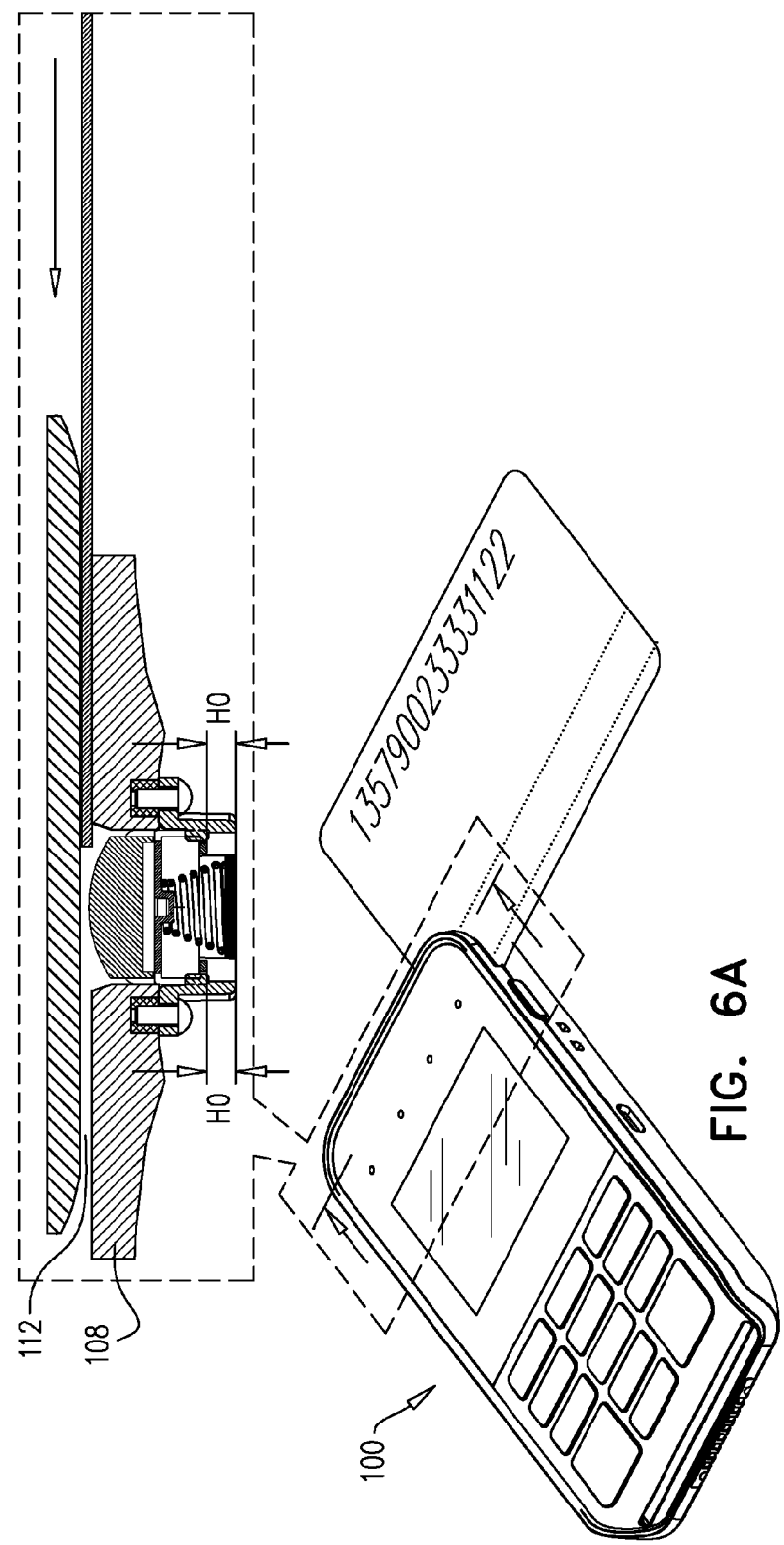
FIGS. 6A, 6B and 6C are simplified illustrations of the card reader of FIG. 1 in three operative orientations, when a card is not engaged with the card reader, when a card initially engages the magnetic stripe reader module and when a card is engaged in magnetic stripe card reader engagement with the card reader.
Figure 6B:
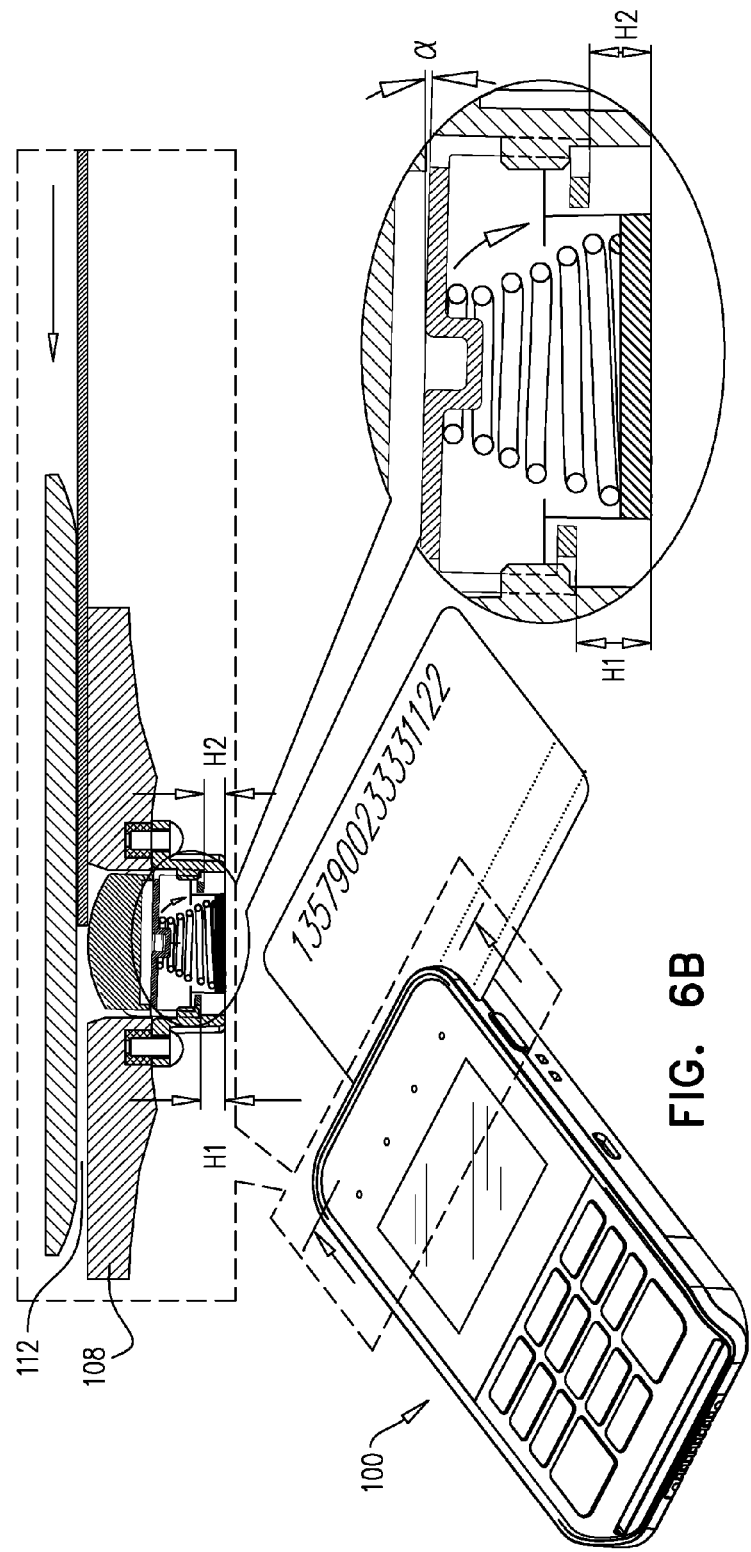
Figure 6C:
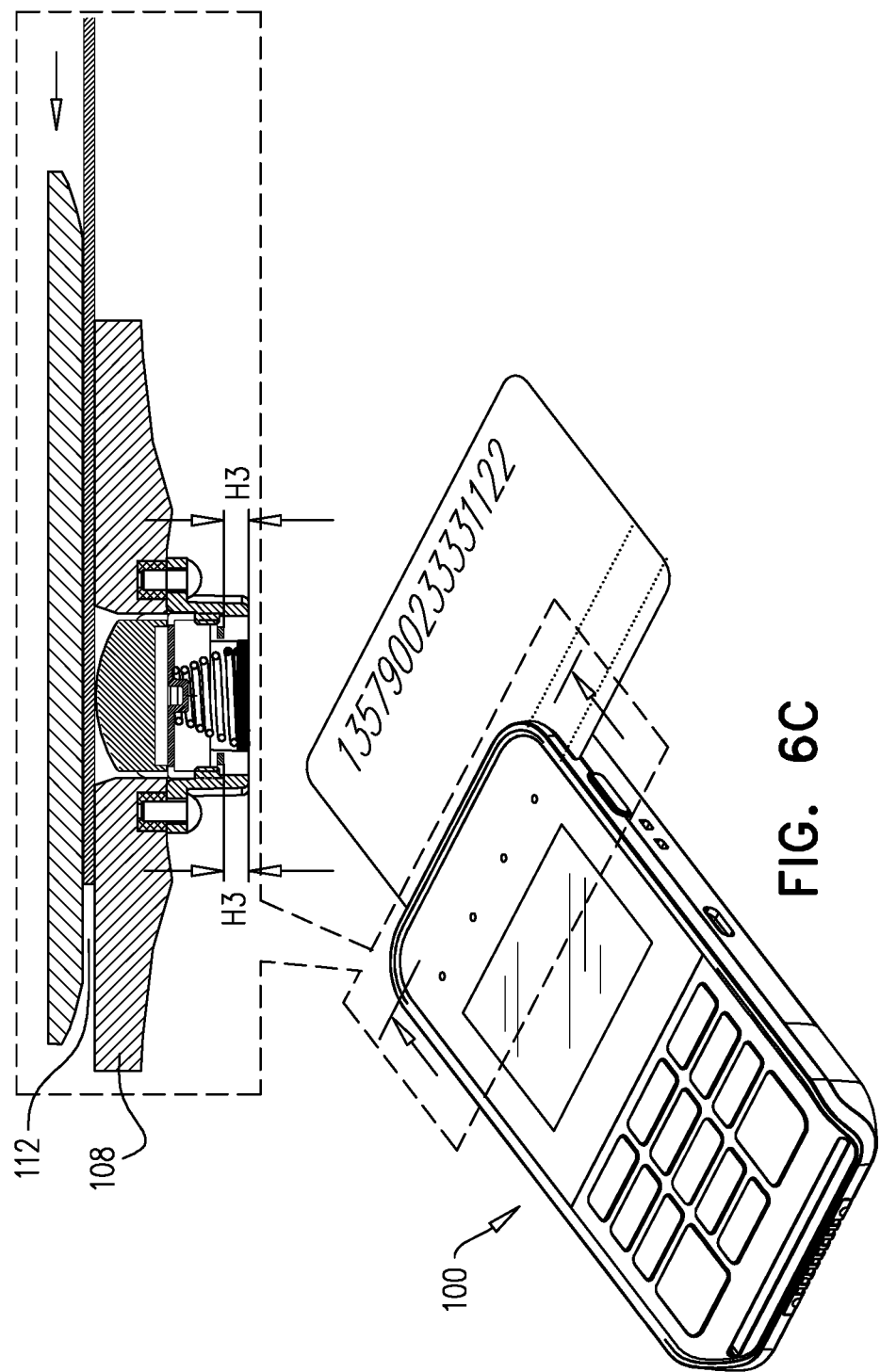

Reference is now made to FIGS. 6A, 6B & 6C, which are simplified illustrations of the card reader of FIGS. 1-5 in three operative orientations, when a card is not engaged with the card reader 100, when a card initially engages the magnetic stripe reader module 114 and when a card is engaged in magnetic stripe card reader engagement with the card reader 100, respectively. As seen by comparing FIGS. 6A and 6B, initial insertion of a payment card into slot 112 and engagement of a leading edge of the payment card with the magnetic stripe reader module 114 causes initial skewed displacement of the magnetic stripe reader module 114 against the urging of truncated cone spring 126, as seen in FIG. 6B.

The displacement of the magnetic stripe reader module 114 and compression of truncated cone spring 126 caused by the engagement of a leading edge of the payment card with the magnetic stripe reader module 114 is seen by a comparison of the distance between a lower surface of central portion 170 of base element 124 and a lower surface of foot portions 144 of leg 136, as indicated by H0 in FIG. 6A, and the distance between the lower surface of central portion 170 of base element 124 and the lower surface of foot portions 144 and 142 of legs 136 and 134, as indicated by H1 and H2 on left and right sides in FIG. 6B, respectively. As seen in FIGS. 6A-6B, H0 and H1 are equal, since the left side of the reader, as seen in FIG. 6B, has not been displaced downwardly, while H2 is less than H0, since the right side of the reader, as seen in FIG. 6B, has been displaced downwardly by the engagement of a leading edge of the payment card with the magnetic stripe reader module 114.

Once the leading edge of the payment card passes the highest portion of the magnetic stripe reader module 114, as seen in FIG. 6C, the magnetic stripe reader module 114 is further displaced against the urging of truncated cone spring 126 and is no longer skewed but is displaced downward with respect to slot 112, as compared with its orientation in the absence of card engagement, as seen in FIG. 6A.

The displacement of the magnetic stripe reader module 114 and compression of truncated cone spring 126 caused by the leading edge of the payment card passing the highest portion of the magnetic stripe reader module 114 is seen by a comparison of the distance between a lower surface of central portion 170 of base element 124 and a lower surface of foot portions 144 of leg 136, as indicated by H1 in FIG. 6B, and the distance between the lower surface of central portion 170 of base element 124 and the lower surface of foot portion 144 of leg 136, as indicated by H3 in FIG. 6C. As seen in FIGS. 6B-6C, H1 is greater than H3 and H2 equals H3, since the left side of the reader, as seen in FIG. 6C, has been displaced downwardly by the engagement of the payment card with the magnetic stripe reader module 114 to the same extent as the right side of the reader was previously displaced.

In a preferred embodiment of the present invention, spring 126 exerts a force of approximately 1.0 Newtons in the absence of a card in slot 112. During card swipe, when a magnetic stripe card is in operative engagement with the magnetic stripe reader module 114, the force exerted by spring 126 increases to about 1.6 Newtons, due to compression of springs 126.

Reference is now made to FIG. 7, which is a simplified illustration of a card reader 300 constructed and operative in accordance with another preferred embodiment of the present invention. As distinguished from card reader 100 described hereinabove with reference to FIGS. 1-6C, card reader 300 is characterized in that it contains a sideways mounted magnetic stripe reader module 314, which may in all relevant respects be identical to magnetic stripe reader module 114 of FIGS. 1-6C.

It will be appreciated by persons skilled in the art that the present invention is not limited by what has been particularly claimed and includes both combinations and subcombinations of features described and shown hereinabove as well as modifications thereof which are not in the prior art.

The invention claimed is:

1. A magnetic stripe reader comprising:
   a base element defining a first spring seat;
   a magnetic module support element arranged for limited pivotable motion relative to said base element and defining a second spring seat, the magnetic module support element comprising:
      a generally planar portion; and
      a pair of legs disposed generally perpendicularly to said generally planar portion,
      each of said pair of legs defining an elongate slot; and
   a truncated conical spring having a first, relatively large diameter end seated in said first spring seat and a second, relatively small diameter end seated in said second spring seat, said truncated conical spring enabling said limited pivotable motion of said magnetic module support element relative to said base element; and
   a magnetic module fixedly mounted onto said magnetic module support element.

2. A magnetic stripe reader comprising:
   a base element defining a first spring seat;
   a magnetic module support element arranged for limited pivotable motion relative to said base element and defining a second spring seat;
   a truncated conical spring having a first, relatively large diameter end seated in said first spring seat and a second, relatively small diameter end seated in said second spring seat; and
   a magnetic module fixedly mounted onto said magnetic module support element,
   said magnetic module support element comprising:
   a generally planar portion; and
   a pair of legs disposed generally perpendicularly to said generally planar portion, each of said pair of legs defining an elongate slot, and
   said base element comprising:
      a pair of cylindrical protrusions; and
      a pair of corresponding protrusions,
      each of said pair of cylindrical protrusions and each of said pair of corresponding protrusions being located in sliding engagement with a corresponding one of said elongate slots associated with one of said pair of legs.

3. The magnetic stripe reader according to claim 2 and wherein said sliding engagement guides and limits mutual spring loaded displacement between said base element and said magnetic module support element.

4. A magnetic stripe reader comprising:
   a base element defining a first spring seat;
   a magnetic module support element arranged for limited pivotable motion relative to said base element and defining a second spring seat;
   a truncated conical spring having a first, relatively large diameter end seated in said first spring seat and a second, relatively small diameter end seated in said second spring seat; and
   a magnetic module fixedly mounted onto said magnetic module support element,
   said magnetic module support element comprising:
      a generally planar portion;
      a pair of legs disposed generally perpendicularly to said generally planar portion, each of said pair of legs defining an elongate slot; and
      a retaining tab extending in a plane parallel to the plane of said generally planar portion; and
      said base element comprising a tab engagement surface portion engaging said retaining tab.

5. The magnetic stripe reader according to claim 1 and wherein said truncated conical spring provides skewed displacement of said magnetic module support element relative to said base element when said magnetic stripe reader is engaged by a leading edge of a payment card.

6. The magnetic stripe reader according to claim 2 and wherein said truncated conical spring provides skewed displacement of said magnetic module support element relative to said base element when said magnetic stripe reader is engaged by a leading edge of a payment card.

7. The magnetic stripe reader according to claim 4 and wherein said truncated conical spring provides skewed displacement of said magnetic module support element relative to said base element when said magnetic stripe reader is engaged by a leading edge of a payment card.

* * * * *